United States Patent [19]

Hawie

[11] Patent Number: 4,595,223
[45] Date of Patent: Jun. 17, 1986

[54] REMOTE CONTROL LINE ASSEMBLY
[75] Inventor: Robert L. Hawie, Stratford, Conn.
[73] Assignee: Hawie Manufacturing Company, Bridgeport, Conn.
[21] Appl. No.: 702,488
[22] Filed: Feb. 19, 1985
[51] Int. Cl.[4] .............................................. A43F 13/06
[52] U.S. Cl. .................. 294/19.1; 294/82.24
[58] Field of Search ....................... 294/19.1, 19.2, 83, 294/82.1, 82.11, 82.24; 114/221 R, 230; 24/241 P, 241 SP, 241 SB

[56] References Cited

U.S. PATENT DOCUMENTS

| | | | |
|---|---|---|---|
| 1,711,346 | 4/1929 | Greve | 24/241 P |
| 2,249,254 | 7/1941 | Osborn | 294/19.1 |
| 3,273,928 | 9/1966 | Wisniewski | 294/19.1 |
| 4,220,310 | 9/1980 | Jantzen | 294/19.1 |

Primary Examiner—James B. Marbert
Attorney, Agent, or Firm—Thomas L. Tully

[57] ABSTRACT

An assembly comprising a line member and an extension member for remotely attaching and detaching a line, such as a boat-mooring rope, to an eye member, such as an eye bolt on a mooring buoy. The line member includes a fastener comprising a carabiner or oblong ring having a gate section which is biased to closed position to prevent separation from an engaged eye member. The extension member comprises a rigid, elongate handle and a line-following surround means designed to be guided from a distance, down over the line and around the carabiner to depress the gate section and permit the carabiner and line to be attached to and detached from an eye member.

10 Claims, 5 Drawing Figures

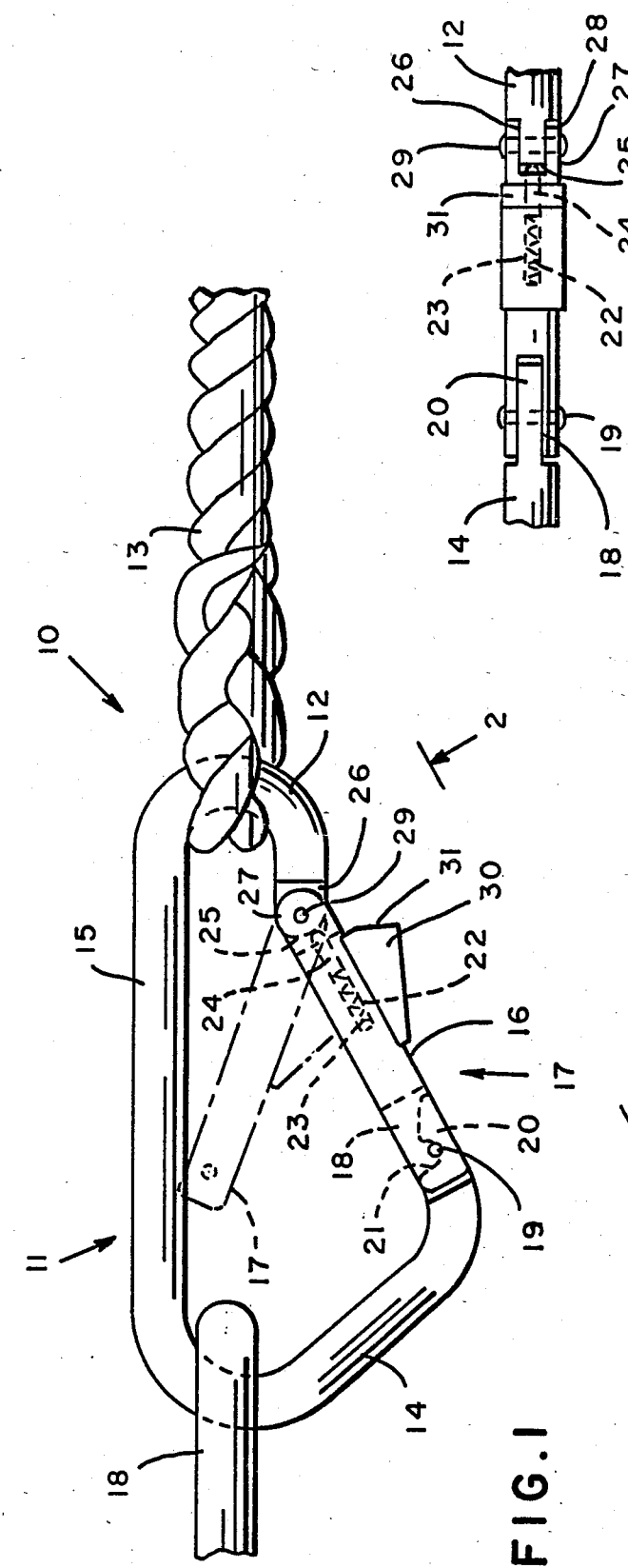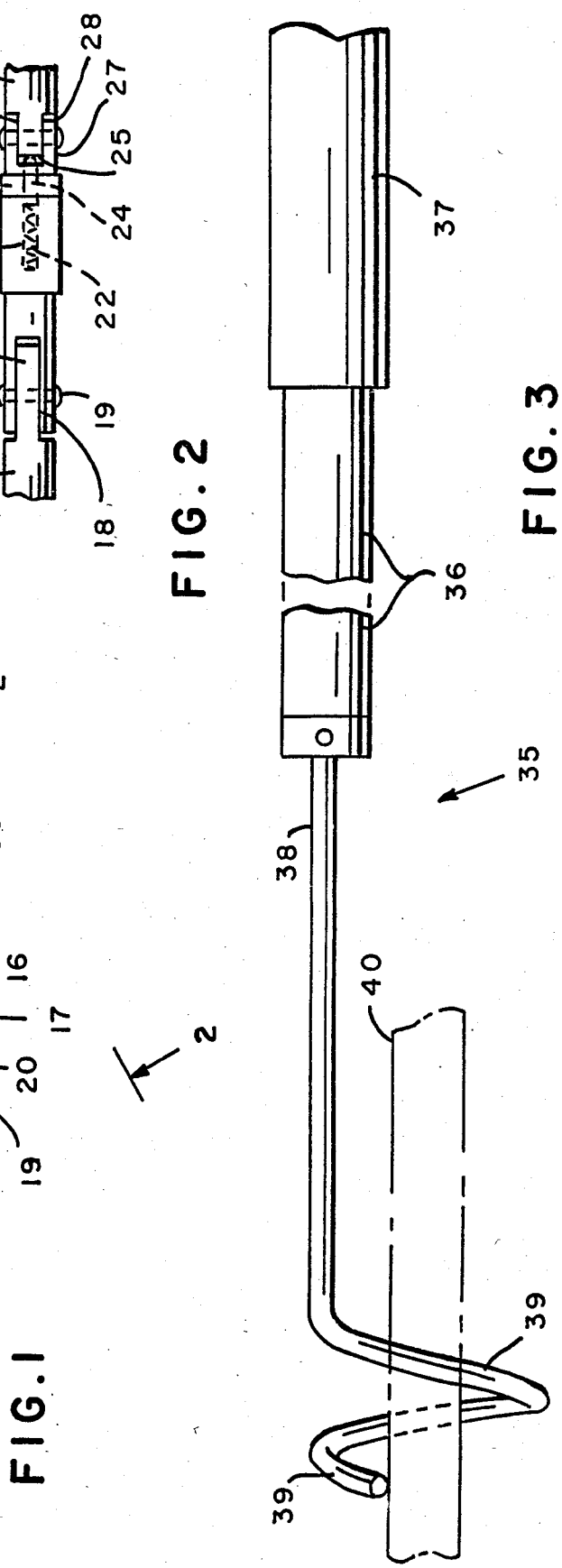

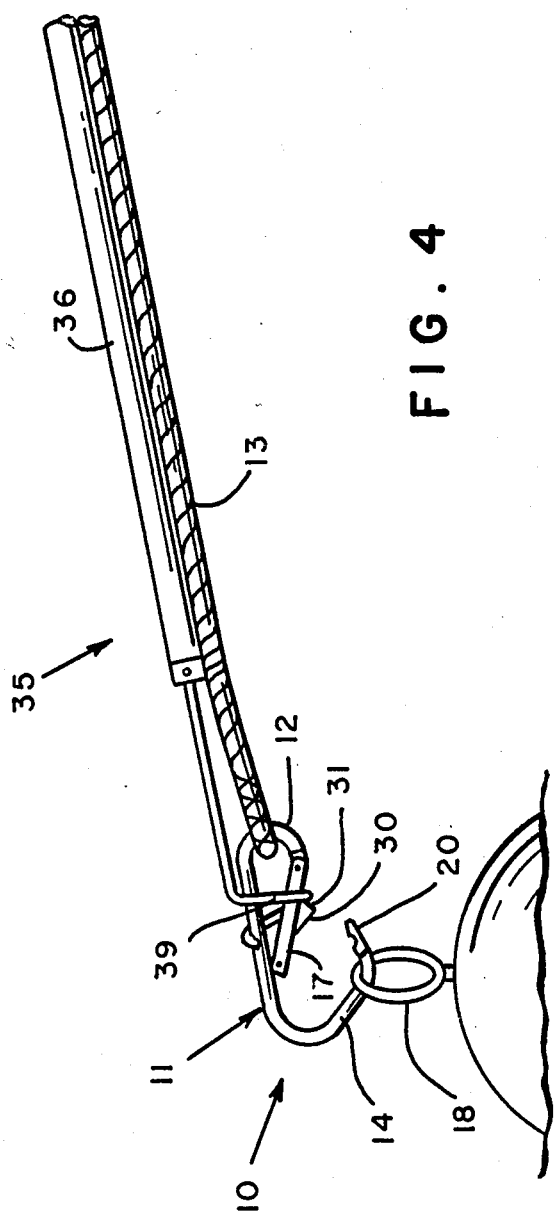
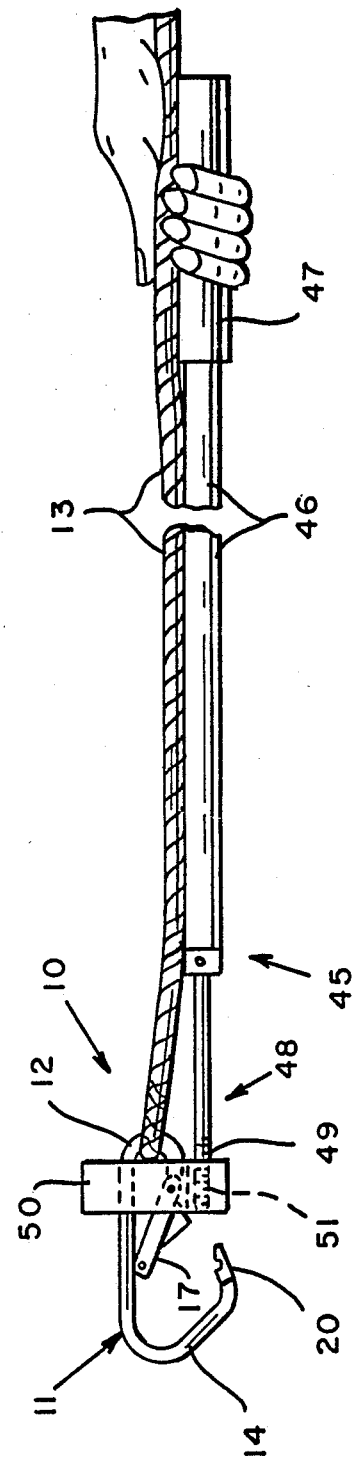

REMOTE CONTROL LINE ASSEMBLY

BACKGROUND OF THE INVENTION

The present invention is concerned with the problem of securing a line such as a rope or chain to a relatively-remote eye member, such as one attached to or otherwise forming a part of an item to be secured. The invention is principally concerned with assemblies for securing a large boat to a mooring buoy or dock or other fixture which is beyond the reach of the boat personnel. However, the invention is also useful for securing a line to any relatively-remote eye member, such as attaching gymnastic ropes to a ceiling, attaching salvage ropes to items which are submerged but within view, etc.

For marine use, it is well-known that it is difficult to attach and detach a tie line to a mooring buoy in cases where a boat is not small enough to permit the user to reach down and manually fasten or unfasten the carabiner or spring-urged clip which secures the tie line to the mooring buoy. Where the freeboard is large, the boatsman must use a long boat hook or gaff to reach down and snag the mooring buoy and lift it up to a height where he can manually snap or unsnap the mooring line clip or carabiner from the buoy eye member. Since buoys for large boats are large and are attached to heavy mooring chains, it is not possible for many boat personnel, such as children and the elderly, to attach or detach a mooring line for a large boat.

Also, in the absence of dockside assistance, it can be difficult and dangerous to dock a large boat during stormy conditions and/or in close proximity to other boats. The ability to fasten tie lines to the dock while the boat is still spaced therefrom by several feet is of great assistance, as is the ability to retain one or more tie lines to the dock for unfastening when the boat is safely spaced therefrom and from other boats during departure.

A remote control line attachment assembly is commercially-available under the trademark Kong Mooring Hook. Such assembly comprises a slide member designed to be attached to a conventional elongate boat hook and to retain a carabiner in open position. This enables the carabiner to be extended out into position to engage the eye member of a mooring buoy or dock, whereupon the elongate boat hook is pulled back to cause the carabiner to close and lock to the eye member. However, the assembly cannot be used to open or detach the carabiner from the eye member. Another assembly, available under the trademark Happy Hooker, is useful for remotely-threading a line through an eye member and for drawing the free end of the line back into the boat. However, such assembly includes separable parts which can become disengaged during use, causing loss of control. Also, such assembly requires that a specific extension thereof must be manually guided through the eye member, which is difficult when the water is rough and/or visibility is poor.

THE INVENTION

The present invention comprises an assembly including a line member, which is very similar to a conventional line or rope having an attached carabiner, and an extension member which is a novel rigid, elongate handle supporting a line-following surround means for reaching out along the line to engage and open the carabiner to permit it to be hooked onto an eye member or to be removed from an eye member.

According to a preferred embodiment, the present invention comprises an assembly in which the carabiner of the tie member has a biased gate supporting on its outer surface a projecting contact member having a forwardly-tapered contact surface which permits the gate to open fully under the effect of a minimum stroke of the extension member, and which prevents the extension member from movement beyond the gate in such fully-opened position.

Also preferred, the surround means of the extension member of the present assembly comprises a helical tool which is capable of engagement with and disengagement from intermediate areas of the length of the tie line in simple fashion for separation of the members of the assembly during periods of nonuse.

THE DRAWING

FIG. 1 is a side view, to scale, of a line member of the present assembly, according to a preferred embodiment of the present invention, the carabiner being shown in engagement with a section of an eye member;

FIG. 2 is a view taken along the line 2—2 of FIG. 1;

FIG. 3 is a side view, to reduced scale, of an extension member of the present assembly, according to a preferred embodiment of the present invention;

FIG. 4 is a perspective view of an assembly comprising the members of FIGS. 1 and 2 in engagement with each other during the attachment and/or detachment of the line member to the eye member of a buoy, and FIG. 5 is a perspective view of an assembly comprising the line member of FIG. 1 and a different extension member in engagement with each other to open the carabiner.

DESCRIPTION OF THE DRAWING

Referring to FIG. 1, the line member 10 thereof comprises a triangle-shaped carabiner 11 having a narrow line-attachment end 12 to which is secured a tie line 13 or rope, and a wide hook end 14, said ends being joined by diverging surfaces 15 and 16. Upper surface 15 is smooth and continuous while lower surface 16 comprises a spring-biased finger section 17 which is also illustrated in depressed or open position by means of broken lines. In order to increase the resistance of the carabiner 11 to being distorted or elongated or opened under the effects of a strong pulling force on an engaged eye member 18, such as on a mooring buoy to which a large boat is tied during a storm, the end of the finger section 17 is slotted at 18 and provided with a transverse pin 19, and the tip 20 of the hook end 14 is machined so as to be received within the slot 18 of the finger section 17 when the latter is in closed position, as shown by FIG. 2, and tip 20 is provided with a recess 21 which receives the pin 19 of the closed finger section 17 to provide engagement and resistance to distortion of the hook end 14 under the effects of a strong pulling force on eye member 18.

The carabiner 11 of FIG. 1 is of the conventional spring-biased type. In the illustrated embodiment the spring 22 is internal, positioned within a bore 23 in the finger section 17, and urges a button or slide member 24 against a tapered guide surface 25 on the machined end 26 of the attachment end 12 of the carabiner. As shown by FIG. 2, the end 27 of the finger section 17 is also slotted at 28 receive the end 26 of the carabiner and a transverse pin 29 provides a pivot point of engagement between finger 17 and carabiner end 26. Slide member 24 extends within the slot 28 to engage the guide surface 25 and to urge the finger element 17 to closed position under the pressure of the spring 22.

In the illustrated preferred embodiment of FIG. 1, the gate or finger member 17 is also provided with a stop member 30 which projects outwardly beyond the maximum width of the attachment end 12 of the carabiner 11 and which has a contact surface 31 which is tapered forward so that a force exerted against the surface 31 will urge the finger element 17 inwardly to fully-open position, the taper of surface 31 increasing the degree of pivot.

The other element of the present assembly, according to a preferred embodiment, is the extension member 35 illustrated by FIG. 3. Member 35 comprises an elongate handle 36 having one or more hand grip sections 37 and supporting a line-following rigid helical rod tool 38, the convolutions 39 of which extend over an arc of at least 360° to completely surround and enclose a tie line 13 which is engaged therewithin parallel convolutions 39 being spaced by a distance which is at least slightly wider than the width of a tie line 13, shown by means of broken lines. The spacing of the parallel convolutions 39 permits a tie line 40 to be engaged and disengaged from within the center of the helical tool 38 in simple fashion by passing the tie line 40 between the parallel convolutions 39. This provides a convenient system for engaging a movable ring member around a tie line for extended movement along the tie line with little chance of disengagement so long as both the tie line 40 and the extension member are maintained relatively parallel to each other during use.

The manner of use of the assembly of the members of FIGS. 1 and 3 is illustrated by FIG. 4. Thus, in order to attach a line member 10 to an eye member 18 of a buoy, such as when approaching a mooring, the line member 10 and the extension member 35 are preengaged by inserting the tie line 13 between parallel convolutions 39 of the helical tool 38 and sliding the tool 38 down the line 13 and around and over the line-attachment end 12 of the carabiner 11. The inner diameter of the helical convolutions 39 is only slightly larger than the maximum width of the carabiner end 12 so that the tool 38 slides over the end 12 until a portion of the helix engages the tapered contact surface 31 of the stop member 30. Then the line 13 is pulled tightly along the length of the extension member 35 to increase the pressure of engagement between the helical tool convolution 39 and the contact surface 31 on the finger section 17 of the carabiner 11 until the finger section 17 is pivoted inwardly against its bias to open position, as shown by FIG. 4. So long as the tie line 13 is maintained taut, relative to the extension member 35, which may be accomplished by gripping the tie line 13 against the handle 36 or grip 37 with one hand, the carabiner 11 will remain in open position as shown by FIG. 4. In such open position, the assembly can be extended down to pull the hook end 14 of the carabiner 11 through the eye of the eye member 18. At the point the tie line 13 is released and the pressure engagement between the portion of the convolutions 39 and the contact surface 31 is relaxed and removed, causing the bias of the finger member 17 to snap the finger member to closed position and lock the engaged eye member 18 against escape from the carabiner ring. Then the extension member is withdrawn along the tie line 13 to the boat, turned at an angle to the tie line 13 to permit the tie line to pass between parallel convolutions 39 of the helical tool 38, and separated therefrom for storage.

In order to detach the line member 10 from the buoy, such as when leaving a mooring, the extension member 35 is removed from storage on the boat, the helical tool 38 is pushed at an angle against the tie line 13 to force the tie line 13 between parallel convolutions 39 of the tool 38, and the handle 36 is swung back into position parallel to the tie line 13 with the helical tool 38 enclosing the tie line 13 in a direction towards the carabiner 11. The extension member 35 is extended down towards the mooring buoy, without any required skill since the helical tool 38 surrounds the tie line 13 and is directed thereby into position over the end 12 of the carabiner 11 and into engagement with the contact surface 31 of the finger member 17. In such position it is merely necessary to hold or push the extension member 35 with one hand while holding or pulling on the tie line 13 with the other hand until the finger member 17 is depressed to open position, as shown by FIG. 4. At this point the extension member 35 can be extended slightly to withdraw the hook end 14 of the carabiner 11 out of engagement with the eye member 18 of the buoy, and the assembly is withdrawn into the boat for separation and storage.

While the extension member of FIG. 3 is preferred because of its simplicity and ease of use, it is also possible to use extension members having other rigid, line-following ring members for engagement with and operation of the finger member 17. For example, FIG. 5 illustrates an extension member 45 having an elongate handle 46 with one or more hand grip sections 47 and an attached tool member 48 comprising a threaded shaft 49 and a sleeve member 50 having a threaded bore 51 for removable threaded engagement with shaft 49. The assembled extension member 45 functions in the same manner as the extension member 35 of FIG. 3 for the opening and closing of the finger member 17 of the carabiner 11, as shown by FIG. 5. The essential difference is that the sleeve member 50, such as of molded nylon plastic, cannot be separated from the tie line 13 except by withdrawal of the free end of the tie line 13 therethrough, or unless a helical slot having a width slightly larger than the width of the tie line 13 is cut therethrough. However, the retention of the sleeve member 50 on the tie line 13 is not a critical disadvantage so long as the handle 46 and rod 49 can be separated therefrom and the sleeve member 50 can be retained on an area of the tie line 13 within the boat where it is accessible for reassembly with the handle 46 and rod 49 as needed. It is also possible to use a surround means comprising an enclosed ring member having a gate section, which may be a biased section similar to finger 17 of the carabiner 11 of FIGS. 1 and 2. Thus, the tie line 13 can be engaged therewithin by pressing it against and through the gate section, and can be removed therefrom by manually opening the gate section to withdraw the tie line 13.

Most preferably, the present extension members, such as 35 of FIG. 3 and 45 of FIG. 5, have telescoping handles providing adjustable extension lengths to satisfy the requirements of use on boats of different sizes and/or different circumstances of use, such as variable distances to docks and to submerged items such as diving tanks, fishing gear, etc., as well as for nonmarine use such as suspending gymnastic equipment from ceilings of different heights and similar uses.

It will also be evident to those skilled in the art that other rigid, line-following surround means may be used in place of the helical tool 38 of FIG. 3 and the sleeve member 50 of FIG. 5, the essential requirement being that such means has an inner diameter or passage, whether circular or oval or member-conforming, which permits the surround means to be slipped along the tie line 13 and over the end of the carabiner or other enclosed clip member having a biased, depressible ring segment or finger member.

It will also be evident to those skilled in the art that the shape of the carabiner or other enclosed ring member is not critical nor is the shape of the projection or stop member on the biased depressible ring segment or finger member. The only requirement is that the outer surface of the finger member, or a projection thereon, extends outwardly a sufficient distance to engage the surround tool of the extension member and remains engaged thereby after the finger member is moved to open position, thereby preventing the surround tool from slipping beyond the finger member to block the opening or to permit the finger member to reclose before desired. This action is facilitated when the carabiner has the shape illustrated by FIG. 1, i.e., narrow at the tie end 12 and wider at the hook end 14 with the sides 15 and 16 diverging outwardly towards the hook end 14.

Variations and modifications in the present invention will be apparent to those skilled in the art within the scope of the present claims.

Having thus described the invention, what is claimed is:

1. An assembly for the remote opening and closing of the spring-biased closure section of a carabiner or ring fastener at the end of a flexible tie line, said assembly comprising a tie member and an extension member, said tie member comprising a flexible tie line attached to the tie end of a carabiner, said carabiner being an enclosed ring fastener having said tie end to which said tie line is attached, an opposed hook end and sides connecting said ends, one said side comprising a pivot section which is pivotably-attached adjacent said tie end and is spring-biased to closed position to close said ring, and which is depressible into the center of said ring to open position to permit an eye member to be engaged over said hook end and locked onto said carabiner when said pivot member returns to closed position, said extension member comprising an elongate handle supporting a rigid, line-following contact member which surrounds said tie line and is extendable by said handle for movement along said flexible tie line, over the tie end of the carabiner and into engagement with said pivot section to depress said pivot section into open position while said flexible tie line is held taut, and being withdrawable from the tie end of the carabiner to permit said pivot section to return to closed position under the pressure of its bias, whereby said pivot section can be opened and closed from a remote distance by the manipulation of said extension member.

2. An assembly according to claim 1 in which the contact member of said extension member has a discontinuous wall which permits the tie line to be inserted and removed from engagement within said contact member.

3. An assembly according to claim 2 in which said contact member comprises a helical rod in which the convolutions extend through an arc of at least 360°.

4. An assembly according to claim 1 in which said carabiner has a narrow tie end, a wider hook end and sides which diverge from said tie end to said hook end.

5. An assembly according to claim 1 in which said pivot section includes an outwardly-extending projection which is engaged by said contact member to move the pivot member to open position.

6. An assembly according to claim 5 in which said projection has a tapered contact surface which increases the degree of the pivot of the pivot member upon engagement with said contact member.

7. An assembly according to claim 1 in which the free end of said pivot section and the end of said hook section each comprise means for engagement when the pivot section is in closed position, to increase the resistance of said ends to separate under the effects of a strong pulling force.

8. An assembly according to claim 7 in which the free end of said pivot section is slotted to receive said hook end and comprises a transverse pin which is received within a recess in said hook end to provide said engagement means.

9. An assembly according to claim 1 in which the handle of said extension member is a telescoping extension handle.

10. An assembly according to claim 1 in which the handle of said extension member includes hand grip means.

* * * * *